> United States Patent Office 3,455,829
Patented July 15, 1969

3,455,829
ORGANIC SUSPENDING MEDIUM AND
COMPOSITION
Franklin I. L. Lawrence, Bradford, and Michael J.
Pohorilla, Berwyn, Pa., assignors to Kendall Refining Company, a corporation of Pennsylvania
No Drawing. Continuation-in-part of application Ser. No. 815,810, May 26, 1959, which is a continuation-in-part of application Ser. No. 559,759, Jan. 18, 1956. This application Mar. 25, 1966, Ser. No. 537,292
Int. Cl. C10m 1/10, 1/14, 3/00
U.S. Cl. 252—31      11 Claims

ABSTRACT OF THE DISCLOSURE

A composition of matter and a method of incorporating in oleaginous compositions a normally oil-insoluble material stably dispersed in a sulfur condensed petroleum hydrocarbon resin produced by contacting a hydrocarbon resin having an ebullioscopic molecular weight in excess of about 500 at a temperature of at least 400° F. with sulfur for a period sufficient to increase the SUS viscosity at 210° F. by at least 200 greater than that of the original resin.

---

This application is a continuation-in-part of application Ser. No. 815,810, filed May 26, 1959, which was in turn a continuation-in-part of application Ser. No. 559,759, filed Jan. 18, 1956, both now abandoned.

This invention relates broadly to the incorporation of oil-insoluble materials into oleaginous compositions. More particularly, this invention relates to oil-compatible, sulfur-condensed hydrocarbons containing suspended, normally oil-insoluble materials and to oleaginous compositions having said sulfur-condensed hydrocarbons with suspended oil-insoluble materials blended therewith. Additionally, this invention encompasses methods whereby normally oil-insoluble materials may be uniformly dispersed throughout an oil-compatible, sulfur-condensed hydrocarbon suspending medium.

In a vast number of industrial applications, it has been found exceedingly desirable to effect a stable blending of normally oil-insoluble materials in oleaginous compositions. Thus, it is desirable to effect a stable dispersion of a wide variety of organic and inorganic oil-insoluble additives in lubricants to enhance the properties of the lubricant. Alkaline earth carbonates, for example, possess excellent detergent properties and successfully counteract the formations of acids in lubricating compositions. Additionally, such oil-insoluble compounds as boric acid, boric acid esters, ascorbic acid, and the like, are known to impart excellent antioxidant characterestics to lubricants. The limited solubility of these materials in oil, however, has greatly restricted their application as lubricant additives.

In other areas, it is also advantageous to effect a stable blending of oil-insoluble materials with oleaginous compositions. For example, it is desirable to blend oil-insoluble copper anti-fouling compounds with oleaginous marine coating compositions and oil-insoluble anti-fungus and anti-termite materials with other oleaginous coatings. Since it often is necessary to reduce a coating compositon to the fluid state with heat or solvents prior to application, it is essential that the oil-insoluble materials remain uniformly distributed throughout the coating composition while the composition is in such fluid or semi-fluid state.

It is an object of the invention to provide oleaginous compositions having normally oil-insoluble materials stably suspended therein.

It is another object of this invention to provide noncorrosive oleaginous compositions having normally oil-insoluble materials stably suspended therein.

It is an additional object of the invention to provide a lubricant which demonstrates high detergency characteristics.

It is a further object of the invention to provide a lubricant having a high oxidation stability.

It is a still further object of the invention to provide oleaginous coating compositions having normally oil-insoluble materials stably suspended therein.

It is yet another object of the invention to provide a process whereby oil-insoluble compounds may be incorporated into sulfur-condensed hydrocarbons.

In accordance with this invention, there is provided a composition of matter ideally suited for incorporation into oleaginous compositions which comprises a normally oil-insoluble material stably dispersed in an oil-compatible, sulfur-condensed hydrocarbon produced by contacting a hydrocarbon starting material having an ebullioscopic molecular weight in excess of about 500, while at a temperature of at least 400° F. (preferably about 425° F. to about 575° F.), with at least about 5% by weight of elemental sulfur for a period of time requisite to produce a final condensation product effective, in a concentration of about 10% by weight, to increase the viscosity index of a 60 at 100 SUS standard base oil derived from a paraffinic crude source at least ten viscosity index units more than does a like amount of the hydrocarbon starting material from which said condensation product is produced.

The present invention is bottomed on the discovery that the herein described noncorrosive, substantially oil-compatible, sulfur-condensed hydrocarbons are excellently suited as a suspending medium or vehicle for oil-insoluble materials to effect a stable suspension of the oil-insoluble materials in oleaginous compositions. While the sulfur-condensed hydrocarbons which constitute the vehicle of the present invention are somewhat heterogeneous in character and are not capable of precise identification, it appears that the sulfurization prouces a material which, at least in substantial part, partakes of a microgel structure. It is this microgel structure which seemingly is responsible for the remarkable effectiveness of these compositions as suspending mediums for oil-insoluble materials.

The term "microgel" as referred to herein denotes hydrocarbons condensed to superpolymeric size, each super-polymeric molecule being essentially a small particle of condensate approximating colloidal dimensions. In accordance with this invention, the oil-insoluble materials are colloidally dispersed in the sulfur-condensed microgel suspending medium preferably by heating and the sulfur-condensed suspending medium containing colloidally dispersed oil-insoluble materials then is incorporated into an oleaginous composition. We have found that it is preferable to disperse the oil-insoluble materials in the microgel prior to incorporation into the oleaginous composition in order to assure their suspension. While the sulfur-condensed microgels of the present invention are oil-compatible, they do not form a true molecular solution with oils, but rather are uniformly suspended throughout the oil as small particles, each particle having approximately colloidal dimensions. Thus the microgels of the present invention, themselves containing colloidally dispersed oil-insoluble materials, effect a uniform distribution of oil-insoluble materials throughout oleaginous base compositions.

The sulfur-condensed microgels of this invention may be employed to incorporate a wide variety of normally oil-insoluble organic and inorganic materials in oleaginous compositions. The sulfur-condensed microgels may be employed to incorporate elemental compounds such as sulfur; metal inorganic salts such as alkaline earth carbonates, alkaline earth chlorides, alkaline earth sulfides; molybdenum sulfides, and the like; solid inorganic acids such as boric acid, and the like, metal organo compounds such as cupric acetate, antimony acetate, boric acid esters, barium carbonate, n-butyl dithiophosphoric acid complexes, and the like; and normally solid organic compounds such as pentachlorophenol, ascorbic acid, β-naphthylphenylamine, di-β-naphthylamine, phenothiazine, and the like.

The compositions of the present invention may be incorporated into all varieties of oleaginous compositions. They may be employed in oils and greases derived from Pennsylvania crude oil, mid-continent crude oil, asphalt base oils, and all other types of mineral oils as well as synthethic oils including the synthetic ester type oils such as di-2-hexylethyl sebacate and di-2-ethylhexyl adipate, and phosphonate oils, such as dibutyl diphosphonate oils, tetrabutyl tetramethylene diphosphonate, and bis-(2-ethylhexyl)-2-ethylhexyl phosphonate. Additionally, the compositions of the present invention may be incorporated into tar and tarlike coating compositions, as well as compositions generally having an oleaginous base.

The sulfur-condensed resin containing oil-insoluble material may be incorporated into oleaginous-base compositions at ambient temperatures if the oleaginous composition is sufficiently fluid to effect a dispersion of the suspending mediums. In the event that the oleaginous-base composition is extremely viscous or solid at ambient temperatures, the compositions of the present invention may be blended with the oleaginous base at elevated temperatures or by the utilization of diluent oils.

The amount of oil-insoluble material to be incorporated into an oleaginous composition will vary depending upon the particular application. In the case of barium carbonate or other antacid compounds in lubricating compositions, it may be desirable to incorporate as much as possible. In the case of fungicides, antioxidants and the like, small quantities, such as .05% or less may accomplish the desired result.

In the interests of orderly presentation, the preparation of the sulfur-condensed microgel first will be described and methods for incorporating the oil-insoluble materials into the suspending medium subsequently will be discussed.

The sulfur-condensed hydrocarbons of this invention are usually characterized by a ring and ball softening point, as measured by A.S.T.M. Method E 28–42T, of more than about 80° F. Some microgels comprehended by the invention have a ring and ball softening point or viscosity too low to be effectively measured in accordance with the aforementioned procedure. Such materials are characterized by a viscosity of at least about 400 SUS at 210° F., preferably at least about 1000 to 5000 SUS at 210° F., and, in any event, a viscosity of at least about 200 SUS at 210° F. greater than the hydrocarbon starting materials from which microgels are produced.

The degree of sulfur condensation contemplated by the present invention most appropriately may be measured by determining the effectiveness of the sulfur-condensed product as a viscosity-index improving agent. Thus, the sulfur-condensed microgel contemplated by the present invention must be effective, in a concentration of about 10% by weight, to increase the viscosity index of a 60 at 100 SUS standard base oil derived from a paraffinic crude source at least ten viscosity index units more than does a like amount of the hydrocarbon starting material from which said condensation product is produced.

The hydrocarbon starting materials which are employed in the production of the microgel suspending medium of the invention must be characterized by an average ebullioscopic molecular weight of at least about 500, preferably at least about 1000. An optimum average ebullioscopic molecular weight range is from about 1200 to 1700. Similarly, the hydrocarbon starting materials employed in preparation of the microgel suspending medium of the invention will be characterized by an SUS viscosity at 210° F. of between about 60 and about 15,000. The preferred materials with a molecular weight of at least about 1000 are further characterized by a viscosity in excess of about 900 SUS at 210° F.

The most appropriate starting materials for the production of the microgels of the invention are suitable crude oil fractions Appropriate fractions derived from crude oils of any source, including Pennsylvania crude oils, mid-continent crude oils, West Coast crude oils, Canadian crude oils, and the like, can be employed. All types of crude oils, including paraffin base crude oils, asphalt base crude oils, and naphthenic crude oils provide suitable sources from which petroleum fractions useful in the production of the microgels of the invention can be derived.

While the invention contemplates the production of microgels from pure or substantially pure individual hydrocarbons, such materials do not constitute optimum starting materials. It will be appreciated, however, that such pure hydrocarbons of appropriate molecular weight can be suitably employed.

With respect particularly to fractions derived from Pennsylvania crude oils, it is preferred that the hydrocarbon starting materials from which the microgels of this invention are produced be characterized by a bromine number not in excess of 10. Many of the pure, high-molecular-weight hydrocarbons suitable as starting materials are characterized by a bromine number of 0.

It is additionally preferred that hydrocarbons which are utilized as starting materials for the production of the microgels of the invention contain more than about 2 naphthenic rings per molecule. The rings individually can be integrated with the paraffinic chain portion of the hydrocarbon molecules or condensed with aromatic rings and/or with other naphthenic ring systems. It is also preferred that the hydrocarbon starting materials contain an average of not more than about 50% aromatic carbon atoms. Hydrocarbons which contain an appreciable quantity of highly condensed ring systems, such as those hydrocarbons which are found in the phenol or furfural extracts of lubricating oils, are operatable and are most appropriately employed as starting materials for the production of microgels designed for use in synthetic lubricating oils compositions such as the diester oils.

Additionally, it is preferred that the petroleum fractions from which the microgels of the invention are produced contain not more than about 10% of wax-type materials. (The wax content herein referred to is determinable by a procedure similar to that described under A.S.T.M. designation D–721–51T with the exception that methyl isobutyl ketone is employed to precipitate the wax, the sample size is reduced to 0.5 gram, and the determination is conducted at 0° F.) While the starting materials which contain substantially more than 10% by weight of wax as determined by this test (e.g. petrolatum which may reflect a wax content on the order of 40% by weight) can be employed in the production of the microgels of the invention, such materials are not preferred. Such materials best can be used by being blended with more desirable starting materials, such as the preferred petroleum fractions above described, in proportions up to about 25% by weight of the total blend.

Normal or vacuum distillation residual stocks and analogous fractions of paraffin base crude oils, such as Pennsylvania crude oils, are highly appropriate starting materials for the production of the microgels employed in this invention. Hydrocarbons precipitated by conventional propane precipitation processes from such residual stocks are particularly suitable.

Further refinement of such propane-precipitated, high-molecular-weight hydrocarbons, which include both light and heavy resin fractions, by extraction with furfural or phenol in conventional manner, yields a raffinate from which microgels of maximum effectiveness are produced. Conventional solvent extraction processes are utilized to obtain such raffinates. Such processes are well known to the prior art and are described in detail, inter alia, in Industrial and Engineering Chemistry, 40, pages 220–227 (1948), and at pages 335–336 of "Chemical Refining of Petroleum" by V. A. Kalichevsky and B. A. Stagner, Reinhold Publishing Co., 1942. Generally, the degree of extraction should be such as to yield about a 70% to 85% raffinate. More drastic extraction, for example, to yield 50% to 60% raffinates, may be practiced to obtain still more desirable starting materials for the production of the microgels of the invention.

The most preferred starting materials for the production of the dispersing mediums of this invention embraces a solvent-extracted Pennsylvania crude oil fraction which has a molecular weight of from about 1200 to about 1700 and a bromine number of not more than about 4, which is substantially wax- and asphalt-free, which contains not more than about 5% by weight of hydrocarbon molecules containing more than 50% aromatic carbon atoms, which consists primarily of hydrocarbon molecules containing an average of from about 2 to about 7 naphthenic rings.

The microgels of the present invention are produced by contacting an appropriate hydrocarbon starting material, while at a temperature of at least about 400° F., preferably from about 425° F. to about 575° F., with at least 5% by weight of elemental sulfur for a time requisite to produce the final condensation product having a viscosity of at least 200 SUS at 210° F. greater than the original starting material.

The rate of supply of elemental sulfur to the reaction mixture is not critical to the production of the condensation products. Two suitable methods of sulfur addition are hereinafter described.

A first method is to add most of the sulfur (about 20 to 25 parts by weight of sulfur per 100 parts of hydrocarbon) at room temperature or some temperature below that at which sulfur will readily react with the hydrocarbon, i.e., about 350° F. The temperature then slowly is raised at a rate so that the foam caused by the hydrogen sulfide generated in the reaction will not overflow the reaction vessel. It generally takes about two to four hours to reach 500° F. A small amount of sulfur then is added with continued heating to bring the condensate up to the desired ring and ball softening point.

According to a second method, the hydrocarbon initially is heated to the reaction temperature, i.e., about 500° F., and then sulfur is added slowly enough so the foam caused by the generated hydrogen sulfide does not overflow the reaction vessel. This rate of sulfur addition is generally about one part by weight of sulfur per 100 parts by weight of hydrocarbon about every 0.25 hour.

About 16 hours or more may be used to effect the condensation but this extreme length of time is not preferred. It is preferable to limit the total time at the elevated temperature to less than about 8 hours. The time required may be reduced down to a few minutes provided the equipment can handle the large amount of foam produced.

Reactive materials, such as chlorine, hydrogen chloride, phosphorus pentoxide, and like materials, which serve as activators, appropriately may be introduced into the reaction mixture in conjunction with the elemental sulfur. Conventional catalysts known to the art may be employed, if desired.

For some applications, it may be desired further to enhance the resistance to oxidation or otherwise improve the condensation products which are employed in the invention. Such modifications effected, inter alia, through chemical modification of the hydrocarbonaceous condensation products, hereinafter described, produce nonequivalent materials. More specifically, the oxidation resistance of such condensation products is increased by further chemical treatment to neutralize reactive groups and/or simultaneously build anti-oxidant properties into the molecular structure.

Polyalkylene polyamines derived from ethylene diamine, such as diethylene triamine, triethylene tetramine, tetraethylene pentamine; aromatic amines such as diphenylamine and o-phenylenediamine; ammonia, and the like, or mixtures thereof, are also suitable modifying agents for the otherwise unmodified hydrocarbonaceous condensation products of the invention.

Additionally, the various isocyanates which correspond to the following formula:

(I) 

in which R is an alkyl group containing from 1 to 10 carbon atoms, and $n$ is any integer from 1 to 3 inclusive, can be employed to modify the sulfur condensation products of the invention. Typical alkyl groups which are represented by R include methyl, ethyl, propyl, isopropyl, butyl, isobutyl hexyl octyl decyl and the like. R may also be aryl, including tolyl, phenyl, diphenyl methane, alpha-naphthyl and the like, in the foregoing isocyanate formulae.

As illustrated in the examples the aforementioned inorganic and organic reagents are utilized, alone or in combination, by heating a mixture of the condensation product and the selected reagent or reagents at an appropriate temperature for a short period of time. In general, at least about 0.25% by weight, preferably about 0.25% to about 5.0% by weight of the organic or inorganic reagents, or mixtures thereof, are employed, based on the weight of the condensation product. Such quantities generally afford an excess of the reagent, which is not objectionable. The temperature and time of the reaction are not critical. A temperature of from about 175° F. to about 500° F. and a reaction time of at least about 20 minutes, preferably from about 20 to 120 minutes, can be observed with satisfactory results. The reaction may be conducted under an inert atmosphere, if desired. In the case of certain of the organic reagents, temperatures must be controlled to prevent decomposition. A preferred procedure is to convert the hydrocarbon fraction employed as a starting material to a sulfur condensation product having a ring and ball softening point somewhat below for example, 10 to 20° below the softening point desired in the final product, followed by reaction with the above-described reagents to an extent requisite to raise the ring and ball softening point to the ultimately desired value.

Additionally, the hydrocarbon starting material initially may be condensed with sulfur to produce an intermediate product which is further reacted with phosphorous pentasulfide, the phosphorus pentasulfide reaction product being finished by condensation with additional sulfur to produce a final product of the desired ring and ball softening point. Alternatively, the hydrocarbon starting material may be first reacted with phosphorus pentasulfide to produce an intermediate product and thereafter condensed with sulfur to produce a final product of the desired ring and ball softening point. More particularly, there may be employed in such processes up to about 5% by weight, based on the hydrocarbon, of phosphorus pentasulfide. The sulfur is employed in an amount requisite, for example, 10% to 30% by weight, to produce the desired physical characteristics, such as ring and ball softening point, in the end product. Other phosphorus sulfides, such as prosphorus sequisulfide and the like, may be employed in a similar fashion.

Inasmuch as many condensation products contemplated by the invention are readily workable only at relatively high temperatures, i.e., 350° to 450° F., an alternative method for modifying such products is adventageously employed when reagents are utilized which may be unstable at such high temperatures. Such alternative procedure embraces first blending the condensation product which is to be modified, with an appropriate base stock in suitable proportions, followed by the addition of the desired quantity of reagent. More specifically, the condensation products may be mixed in proportions from about 20% to 50% by weight with, for example, the ultimate base stock in which they are to be utilized. To the mixture so obtained, there is then added from about 1 to about 5% by weight of the desired reagents, based upon the condensation product, preferably in small proportions. This addition may be effected under an inert atmosphere, if desired. The desired reaction is then effected at a temperature of from about 175° F. to 275° F. The ultimate product so obtained is then admixed in appropriate concentration with additional quantities of the base stock employed. This procedure is particularly applicable in the modification of the condensation product through utilization of such reagents as the isocyanates and amines, as above defined.

In some applications, it is desirable to treat the sulfur-condensed product employed in this invention to reduce further or minimize the corrosivity thereof. It is generally considered that, to the extent that such condensation products are corrosive, such characteristic is attributable to the presence of residual sulfur compounds, such as hydrogen sulfide, reactive organic sulfides and polysulfides, mercaptans, and the like. Such corrosivity can be eliminated in various ways, two of which are described hereinafter.

A first method is generally chemical in its approach and entails the treatment of the material with an oxidizing agent, such as air or elemental oxygen; hydrogen peroxide; the various other inorganic peroxides; inorganic chlorates and perchlorates, such as sodium chlorate, potassium chlorate, sodium perchlorate, potassium perchlorate; chlorine dioxide; nitrogen dioxide; organic peroxides and hydroperoxides such as benzoyl peroxide, di-tert-butyl peroxide, cumene hydroperoxide, tertiary butyl hydroperoxide, and the like. The invention contemplates the use broadly of oxidizing agents to reduce or minimize the corrosivity of the sulfur condensation product.

A second method for minimizing corrosivity of the sulfur condensation product is essentially physical in character and entails contacting the condensation product with an inert gas at an elevated temperature normally as a sweep gas either during or immediately after the condensation reaction. A representative inert gas useful for this purpose is nitrogen.

The condesation products produced in the above-described manner not only constitute excellent suspending mediums for oil-insoluble materials in oleaginous compositions, but additionally exhibit marked viscosity index improving characteristics. Thus when the compositions of the present invention are incorporated into lubricants, power transmission fluids, shock absorber fluids and the like, the viscosity index and detergency or the viscosity index and oxidation stability of the base composition simultaneously may be enhanced. Moreover, oil-insoluble antioxidants may be incorporated into the sulfur-condensed hydrocarbon to enhance its own resistance to oxidation and thereby permit its utilization as a viscosity index improving agent in very high temperature service.

The method which most appropriately may be employed to incorporate the oil-insoluble material into the sulfur-condensed microgel will vary depending upon the characteristics of the oil-insoluble material to be dispersed.

In the event that the material to be dispersed in the sulfur-condensed microgel has a melting point not in excess of about 600° F., the oil-insoluble material may be heated to the liquid state and thoroughly admixed with heated sulfur-condensed microgel. Upon cooling, the normally oil-insoluble material will be finely dispersed throughout the sulfur-condensed microgel. Sulfur, for example, may be heated to the fluid state and blended with the sulfur-condensed hydrocarbon.

If the material to be dispersed in the sulfur-condensed microgel is soluble in a solvent which is oil-miscible, the oil-insoluble material may be dissolved in the solvent, thoroughly blended with the microgel, and thereafter the mixture may be heated to release the solvent. Copper acetate, for example, may be dissolved with acetic acid and blended with the sulfur-condensed microgel. Subsequent heating to 400–450° F. releases the acetic acid and leaves minute particles of cupric acetate suspended throughout the microgel.

It was attempted to produce an additive by substituting the non-acidic condensed resin of the present invention for the acidic organic compound of prior art processes. Inoperable gels were obtained which could not be filtered and which would not disperse in oil as compared with the readily filtrable, readily dispersible microgels of the invention.

The following examples are presented for purposes of more specific illustration of the compositions and processes of the invention. It is not intended that the scope of the invention be limited by the specific embodiments described.

A. PREPARATION OF SULPHUR-CONDENSED MICROGEL

Example I.—Separation from cylinder stock of viscous hydrocarbons for use in the preparation of dispersing mediums About 75,000 grams of a cylinder stock derived by distillation from paraffin-base Pennsylvania crude oil and characterized by a boiling point in excess of about 850° F., a molecular weight of about 750, a viscosity at 210° F. of 225 SUS, an A.P.I. gravity of about 24.8, and a flash point (Cleveland Open Cup) of about 600° F., were mixed with propane, heated to a temperature of about 190° F. and then cooled to a temperature of about 65° F. The cylinder stock-propane solution thereafter was transferred into a chilling tank wherein the pressure was reduced to an extent requisite to volatilize sufficient propane to lower the temperature of the solution from about −20° F. to about −50° F. Makeup propane was added during the chilling operation, such that the ratio of propane to cylinder stock was about 3 to 1 at the end of the chilling cycle. During the chilling cycle, petrolatum was precipitated from the solution. The chilled cylinder stock-propane solution containing precipitated petrolatum was transferred to a filter feed tank and thence passed through an appropriate filter to effect removal of the petrolatum from the chilled solution.

Propane was added to the filtrate in an amount sufficient to raise the propane-cylinder stock ratio to about 10 to 1 and the temperature of the solution so obtained was elevated to about 150° F. to 180° F. whereupon about 15,000 grams of high molecular weight viscous materials were precipitated. The viscous materials still contained some propane.

The material so obtained was mixed at a temperature of about 130° F. to 135° F. with additional propane to increase the propane-oil ratio to about 20 to 1. The temperature of the resulting solution was lowered to about 100° F. whereupon about 6,000 grams of viscous hydrocarbons were precipitated. These materials, after removal of all residual propane, are designated as heavy resins and are characterized by a molecular weight of about 1400, a viscosity of about 4100 SUS at 210° F., and a bromine number of 3.7.

The remaining oil-propane solution was heated to about 150° F. whereupon 9,000 grams of additional viscous hydrocarbons which are designated as light resins, were precipitated. Any residual propane was removed in a flash chamber. These hydrocarbons are characterized by a molecular weight of about 1300, a viscosity of about 1150 SUS at 210° F., and a bromine number of about 4.0.

Sulfur condensation

About 9000 grams of the viscous materials separated from the cylinder stock, in the manner above described and designated as light resin, and 1000 grams of bright stock were charged to suitable apparatus and initially heated to a temperature of 500° F. Sulfur was introduced into the mixture in increments totaling about 1% of the weight of the mixture as the temperature was raised. The sulfur addition was continued for approximately 8 hours until a total amount of sulfur equal to about 22% by weight of the mixture was added, during which time the reaction mixture was maintained at a temperature of approximately 500° F. to produce a final product characterized by a ring and ball softening point of about 145° F. The final product was contacted with air to remove undesirable reactive sulfur compounds therefrom and to produce a material noncorrosive to a copper strip when tested pursuant to ASTM Procedure D-130. The bright stock referred to was a fraction of Pennsylvania paraffin-base crude oil having a boiling point range greater than about 850° F., a viscosity of about 150 SUS at 210° F. and obtained by solvent dewaxing and deresining of cylinder stock.

Example II

A microgel was prepared in a manner identical to Example I with the exception that the condensation process was terminated when the product was characterized by a ring and ball softening point of about 200° F. The material so formed was noncorrosive to a copper strip when evaluated pursuant to ASTM Procedure D-130.

Example III

The process of Example I was repeated but in this instance the condensation process was stopped at a point requisite to produce a microgel having a ring and ball softening point of about 286° F. The material so formed was noncorrosive to a copper strip when evaluated pursuant to ASTM Procedure D-130.

Example IV

A sulfur-condensed microgel was prepared from a fraction of Pennsylvania paraffin-base crude oil designated as heavy resin described in Example I, which had been further processed by solvent extracting with phenol to a 65% raffinate yield.

The material above described was characterized by an average molecular weight of about 1680, a viscosity of about 1550 SUS at 210° F., a bromine number of 1.2, and was substantially wax- and asphalt-free. This material was heated to a temperature of about 475° F. and condensed with about 21% by weight of sulfur while the reaction mixture was maintained within a temperature range of 450–500° F. for a time requisite to produce a product having a ring and ball softening point of about 154° F. The final product was blown with air to render it noncorrosive to a copper strip when tested in accordance with ASTM Procedure D-130.

Example V

Example IV was repeated with the exception that the condensation reaction was continued to produce a product having a ring and ball softening point of about 250° F. The composition so obtained was noncorrosive to a copper strip when tested in accordance with ASTM Procedure D-130.

Example VI

Example IV was repeated with the exception that the condensation reaction was continued to produce a product having a ring and ball softening point of about 270° F. The composition so obtained was noncorrosive to a copper strip when tested in accordance with ASTM Procedure D-130.

Example VII

Sulfur-condensed microgels were prepared with the variations of starting materials and ring and ball softening points in the final condensation products as indicated in table below. All of the sulfur-condensed microgels so produced were noncorrosive to a copper strip when tested in accordance with ASTM Procedure D-130.

TABLE

| Sulfur condensed materials | Percent sulfur treat. | Percent sulfur in prod. | R. & B. Soft. Pt., ° F. | SUS vis. at 210 | Ebull. M.W. | V.I. of 10% blend in 60/100 |
|---|---|---|---|---|---|---|
| Heavy resin [1] | 0 | 0.26 | | 4,100 | 1,400 | 115.7 |
| | 12 | 2.91 | 110 | | 1,495 | 130.9 |
| | 21.75 | 4.20 | 253 | | | 148.8 |
| Light resin [2] | 0 | 0.17 | | 1,210 | 1,110 | 115.8 |
| | 13.5 | 2.94 | | 4,600 | 1,250 | 125.5 |
| | 24.6 | 4.74 | 246 | | | 156.5 |
| Solvent refined paraffin base bright stock [3] | 0 | 0.14 | | 140 | 683 | 105.3 |
| | 26.0 | 5.10 | | 4,340 | 917 | 116.2 |
| | 31.0 | 7.7 | 260 | | | 140 |
| Solvent extracted mixed base bright stock [4] | | 0.21 | | 153 | 769 | 96.6 |
| | 22 | 4.28 | | 1,206 | 826 | 113.0 |
| | 25.6 | 4.92 | 248 | | | 137.9 |
| California base bright stock [5] | 0 | 0.39 | | 185 | 688 | 97.2 |
| | 16 | 3.48 | | 1,185 | 816 | 108.8 |
| | 22 | 5.04 | 258 | | | 128.6 |
| High viscosity resin [6] | 0 | 0.27 | | 20,564 | 1,480 | 124.5 |
| | 8.06 | 1.79 | 138 | | 2,130 | 136.4 |
| | 16.52 | 2.75 | 245 | | | 148.4 |
| Naphthenic base bright stock [7] | 0 | 0.33 | | 133 | 475 | 85.5 |
| | 10 | 2.32 | | 408 | 526 | 115.4 |

[1] The heavy resin derived from Pennsylvania base crude oil and described in Example I.
[2] Light resin derived from Pennsylvania base crude as described under Example I and characterized by a viscosity at 210° F., of 1,210 SUS and an average molecular weight of about 1,110.
[3] Solvent refined paraffin base bright stock derived by propane dewaxing of Pennsylvania crude residual cylinder stock and phenol extraction to a 92.0% raffinate yield. This stock is characterized by a viscosity at 210° F. of about 140 SUS, a viscosity index of about 102, a flash point of about 550° F. and a pour point of +15° F.
[4] Solvent extracted mixed base bright stock prepared by solvent treatment of a Mid-continent base crude residuum and characterized by a viscosity of 152.8 SUS at 210° F., a bromine number of 2.4, and a molecular weight of about 770.
[5] California base bright stock derived by solvent refining of a California crude residuum and characterized by a viscosity at 210° F. of about 185 SUS and a V.I. of about 84.7.
[6] High viscosity resin derived from Pennsylvania base crude oil by propane precipitation from cylinder stock and characterized by a viscosity at 210° F. of about 20,565 SUS, a flash point of 660° F., a fire point of about 735° F., carbon residue of 13.95%, and 0.44% naphtha insolubles.
[7] Naphthenic base bright stock, a residuum obtained from a naphthenic base crude oil and characterized by a viscosity of 133 SUS at 210° F., a flash point of 490° F., a pour point of +20° F., and a carbon residue of about 0.75%.

Example VIII

About 100 parts by weight of a bright stock extract, which is a fraction of Pennsylvania crude oil removed from Pennsylvania bright stock by phenol extraction, was employed as the starting material for the production of the sulfur-condensation product useful as a suspending medium in accordance with the invention. The bright stock extract employed was characterized by the following physical properties:

Gravity (°/API) _____ 10.4
Viscosity at 100° F. (SUS) _____ 840,000
Viscosity at 210° F. (SUS) _____ 1210
Viscosity index _____ −173

The bright stock extract was condensed with sulfur under the conditions corresponding to those described in Example I to produce a final product having a ring and ball softening point of about 248° F. and containing about 3.4% of combined sulfur. The condensation product was contacted with air to render it noncorrosive to a copper strip when tested in accordance with ASTM Procedure D–130.

Example IX

A light resin raffinate obtained by phenol extraction of the light resins described in Example I to an 85% raffinate and characterized by an ebullioscopic weight of about 1350 and a viscosity at 210° F. of about 916 SUS was sulfur-condensed in a manner similar to that described in Example I to a ring and ball softening point of about 188° F. The sulfur-condensed raffinate was reacted at a temperature of about 400° F. for a period of about one hour with about ½% of a mixture of polyalkylene polyamines which was predominantly diethylene triamine and triethylene tetramine. The ring and ball softening point of the reaction product was 220° F.

Example X

Example IX was repeated with the exception that the light resin raffinate sulfur-condensed microgel had a ring and ball softening point of about 216° F. Such product was treated with about 2% by weight of diphenylamine under the same conditions and in the same manner as described in Example IX.

Example XI

A light resin raffinate sulfur-condensed microgel of the type described in Example IX but having a ring and ball softening point of about 249° F. was reacted with ammonia gas for a period of about one hour at a temperature of 500° F. Gaseous ammonia was passed through the reaction mixture at the rate of about 8 liters per hour. The reaction product had a ring and ball softening point of about 260° F. and contained 0.8% chemically combined nitrogen.

Example XII

Approximately 5000 grams of the light resin described in Example I was heated to about 425° F. Elemental sulfur was added in 1% by weight increments every fifteen minutes for a total of about 23.5% sulfur. Nitrogen gas was passed through the reacting mixture continuously at the rate of about 1 liter per minute. The final product was characterized by a ring and ball softening point of about 182° F. A blend of about 10% by weight of this product in the same medium neutral raffinate exhibited no tarnish or corrosion when evaluated by the ASTM Copper Strip Corrosion Test D–130.

B. INCORPORATION OF OIL-INSOLUBLE MATERIAL INTO SULFUR-CONDENSED HYDROCARBONS

Example XIII

The product of Example II was heated to a temperature of about 400° F. and 30% by weight of pentachlorophenol was dissolved in the molten sulfur-condensed hydrocarbon. Upon cooling, the pentachlorophenol was uniformly and stably dispersed throughout the sulfur-condensed hydrocarbon.

Example XIV

The product of Example II was heated to a temperature of approximately 460° F. and 1% boric acid was added to the molten sulfur-condensed hydrocarbon. Upon cooling, the boric acid was finely distributed throughout the sulfur-condensed hydrocarbon in a stable dispersion.

Example XV

A sulfurized light resin raffinate having a ring and ball softening point of 195° F. was heated to 375° F. and 5% by weight of molybdenum disulfide was added with stirring to the molten sulfurized hydrocarbon. The molybdenum disulfide was stably dispersed in the condensate.

Example XVI

Cupric acetate in an acetic acid solution was added to the product of Example II in an amount approximating 0.5% of the weight of the sulfur-condensed hydrocarbon. After heating the mixture to approximately 400° F. to release the acetic acid, the product was cooled and found to contain finely divided cupric acetate in stable dispersion.

Example XVII

The light resin described in Example I was heated with 20% by weight of elemental sulfur to produce a sulfur-condensed hydrocarbon with a ring and ball softening point of about 144° F. This product contained 5.23% chemically combined sulfur. At this stage in the condensation process, the temperature was lowered to 300° F. and elemental sulfur was incrementally added over a period of one hour. Approximately an additional 4% by weight of sulfur was incorporated into the reaction mixture. The ring and ball softening point remained relatively unchanged, having a final value of about 150° F. The total sulfur content was 7.86%, of which 2.63% is uncombined chemically, being dispersed within the microgel. This product was blended with a medium neutral raffinate, and exhibited no instability after several months' storage.

Example XVIII

A sulfur condensed microgel of the type described in Example I was prepared with the exception that in place of the 1000 grams of bright stock, 1000 grams of high phenyl containing silicone, Dow Corning 710, was used. The silicone was not added until two hours before the resin was condensed to the 145° F. ring and ball stage. The product with a ring and ball softening point of 145° F. was dispersed in a light paraffinic neutral oil to a concentration of 0.5% of the silicone in the neutral oil. The dispersion was observed for three months without there being any evidence of separation of the silicone from the neutral oil as would ordinarily be the case in the absence of the sulfur condensed microgels. The silicone was stably dispersed in the microgels.

Example XIX

The process of Example I was repeated. The sulfur condensed resin was placed in a Baker Perkins mixer and 5% by weight of a perfluoro carbon $C_8F_{16}$ was added. The two components were mixed for one hour. Then this product was mixed further for ½ hour with a 100 SUS at 100 neutral oil in the ratio of 1 to 1. Finally using ordinary mixing techniques the sulfur condensed resin was diluted to a concentration of 10% in the 100 at 100 neutral. After two weeks' observation, there was no settling of the perfluoro compound. The conclusion being that the perfluoro compound was stably dispersed in the microgel; whereas, it has only limited solubility in the light neutral oil.

Since modifications of the invention will be apparent to those skilled in the art, the invention is intended to be limited only by the scope of the appended claims.

We claim:
1. A composition of matter for incorporation in oleaginous compositions consisting essentially of a normally oil-insoluble material stably dispersed in a sulfur-condensed hydrocarbon suspending medium produced by contacting a hydrocarbon starting material having an ebullioscopic molecular weight in excess of about 500 while at a temperature of at least 400° F. with at least about 5% by weight of elemental sulfur, said sulfur condensed hydrocarbon being effective in a concentration of about 10% by weight to increase the viscosity index of a 60 at 100 SUS standard base oil derived from a paraffinic crude source at least ten viscosity index units more than does a like amount of the hydrocarbon start- ing material from which said condensation product is produced.

2. The composition of claim 1 wherein the dispersed oil-insoluble material is in the solid state.

3. The composition of claim 2 wherein the dispersed material is sulfur.

4. The composition of claim 1 wherein the dispersed oil-insoluble material is a normally solid inorganic acid.

5. The composition of claim 1 wherein the dispersed oil-insoluble material is a solid organo-metal compound.

6. The composition of claim 1 wherein the dispersed oil-insoluble material is a solid organic compound.

7. The composition of claim 1 wherein the dispersed oil-insoluble material is an inorganic metal salt.

8. The composition of claim 1 wherein the dispersed oil-insoluble material is a silicone.

9. The method of stably dispersing a normally oil-insoluble material in an oleaginous composition comprising the steps of suspending said normally oil-insoluble material in a sulfur-condensed petroleum hydrocarbon resin containing more than 2 naphthenic rings per molecule and not more than 10% of wax type materials and produced by fractionation of heavy petroleum fraction with a liquified normally gaseous hydrocarbon, said resin having an ebullioscopic molecular weight in excess of about 1000 and an SUS viscosity at 210° F. of at least 900 and a bromine number less than 10 condensed by heating said resin at a temperature of at least 400° F. with at least about 5% by weight of elemental sulfur for a period sufficient to increase the SUS viscosity at 210° F. by at least 200 greater than that of the original resin, said sulfur condensed hydrocarbon being effective in a concentration of about 10% by weight to increase the viscosity index of a 60 at 100 SUS standard base oil derived from a paraffinic crude source at least ten viscosity index units more than does a like amount of the hydrocarbon starting material from which said condensation product is produced and adding the resulting suspension to the oleaginous composition.

10. The method of claim 9 wherein the suspended oil-insoluble material is heated to its melting point before adding to said sulfur condensed resin.

11. The composition of claim 1 wherein the dispersed oil-insoluble material is a perfluoro compound.

References Cited

UNITED STATES PATENTS

| 2,485,861 | 10/1949 | Campbell et al. | 252—18 |
| 2,614,985 | 10/1952 | Cook | 252—25 |
| 2,732,346 | 1/1956 | Jones et al. | 252—45 |
| 2,822,332 | 2/1958 | Logan | 252—45 |

OTHER REFERENCES

"Motor Oils and Engine Lubrication" by Georgi, Reinhold Pub. Corp., New York, 1950, p. 170.

DANIEL E. WYMAN, Primary Examiner

I. VAUGHN, Assistant Examiner

U.S. Cl. X.R.

252—25, 45, 49.6, 116

UNITED STATES PATENT OFFICE
CERTIFICATE OF CORRECTION

Patent No. 3,455,829                                 July 15, 1969

Franklin I. L. Lawrence et al.

It is certified that error appears in the above identified patent and that said Letters Patent are hereby corrected as shown below:

Column 2, line 8, after "having" cancel "a"; line 41, "prouces" should read -- produces --. Column 4, line 46, "operatable" should read -- operable --; line 49, "oils", first occurrence, should read -- oil --. Column 6, line 22, "isobutyl hexyl octyl decyl" should read -- isobutyl, hexyl, octyl, decyl, --; line 26, after "examples" insert a comma. Columns 9 and 10, in the TABLE, seventh column, lines 6 to 9 thereof, "156.5", "105.3", "116.2", and "140" should read -- 156.3 --; -- 105.2 --, -- 116.0 --, and -- 145 --. Column 12, line 47, "$C_8F_{16}$" should read -- $C_8F_{16}O$ --.

Signed and sealed this 9th day of June 1970.

(SEAL)
Attest:

EDWARD M. FLETCHER, JR.                        WILLIAM E. SCHUYLER, JR.
Attesting Officer                                       Commissioner of Patents